United States Patent
Weighton et al.

(10) Patent No.: US 11,635,528 B2
(45) Date of Patent: Apr. 25, 2023

(54) GPS RECEIVER MODULE

(71) Applicant: Rockwell Collins, Inc., Cedar Rapids, IA (US)

(72) Inventors: James K. Weighton, Central City, IA (US); Kenneth Cogan, Cedar Rapids, IA (US); Benjamin Graubard, Alburnett, IA (US); Troy V. Mundt, North Liberty, IA (US); Jimmey Stultz, Cedar Rapids, IA (US); Meraj Choudhury, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 253 days.

(21) Appl. No.: 16/991,898

(22) Filed: Aug. 12, 2020

(65) Prior Publication Data
US 2022/0050215 A1 Feb. 17, 2022

(51) Int. Cl.
*G01S 19/37* (2010.01)
*G01S 19/10* (2010.01)
(Continued)

(52) U.S. Cl.
CPC .............. *G01S 19/37* (2013.01); *G01S 19/10* (2013.01); *G01S 19/36* (2013.01); *G01S 19/13* (2013.01); *H01Q 1/241* (2013.01)

(58) Field of Classification Search
CPC .......... G01S 19/37; G01S 19/10; G01S 19/36; G01S 19/01; G01S 19/13; H01Q 1/241
(Continued)

(56) References Cited

U.S. PATENT DOCUMENTS

| 5,528,248 A | * | 6/1996 | Steiner | G01S 19/35 342/357.31 |
| 6,593,878 B2 | * | 7/2003 | Fall | G01S 19/35 709/217 |

(Continued)

FOREIGN PATENT DOCUMENTS

| EP | 1405439 A1 | | 4/2004 | |
| EP | 3499269 A1 | * | 6/2019 | ........... G01S 19/215 |
| EP | 3518004 A2 | | 7/2019 | |

OTHER PUBLICATIONS

L3HARRIS Interstate Electronics Corporation, Press Release—L3 IEC to Showcase New Military M-Code Receiverat AUSA 2011, https://www2.l3t.com/iec/news/r_%20pr/100311.html, Oct. 3, 2011, 1 page.
(Continued)

*Primary Examiner* — Chuong P Nguyen
(74) *Attorney, Agent, or Firm* — Suiter Swantz pc llo

(57) ABSTRACT

A navigation satellite receiver system is disclosed. The system includes a host receiver. The host receiver includes a user interface, a module connector, and a controller coupled to the user interface and the module connector. The system further includes a receiver module operably coupled to the receiver module. The receiver module includes an antenna configured to receive one or more satellite navigation signal. The receiver module further includes an interface receiver card operably coupled to the module antenna. The interface receiver card is configured to process the one or more navigation signals. The receiver module further includes a host connector communicatively coupled to the interface receiver card and is configured to couple to the module connector. The module includes a housing configured to receive and protect the interface receiver card, the antenna, and the host connector.

13 Claims, 4 Drawing Sheets

(51) Int. Cl.
*G01S 19/36* (2010.01)
*H01Q 1/24* (2006.01)
*G01S 19/13* (2010.01)

(58) Field of Classification Search
USPC ............ 342/357.39, 357.76, 357.77, 357.47, 342/357.51
See application file for complete search history.

(56) References Cited

U.S. PATENT DOCUMENTS

| | | | |
|---|---|---|---|
| 7,546,395 B2 * | 6/2009 | Yamamoto | G01S 19/09 |
| | | | 342/357.41 |
| 7,944,997 B2 | 5/2011 | Douglas | |
| 8,442,020 B1 | 5/2013 | Peterson | |
| 9,500,483 B1 * | 11/2016 | Stockmaster | G01S 19/42 |
| 10,795,030 B2 * | 10/2020 | Schipper | G01S 19/53 |
| 10,809,384 B2 * | 10/2020 | Jackson | G01S 19/32 |
| 11,194,055 B2 * | 12/2021 | Jackson | G01S 19/23 |
| 2002/0196181 A1 * | 12/2002 | Fall | G01S 19/35 |
| | | | 342/357.4 |
| 2008/0228982 A1 | 9/2008 | Kimchi et al. | |
| 2010/0073228 A1 | 3/2010 | Smith | |
| 2016/0205814 A1 | 7/2016 | Burke | |
| 2020/0072985 A1 * | 3/2020 | Schipper | G01C 21/12 |
| 2021/0072403 A1 * | 3/2021 | Koide | G01S 19/36 |
| 2021/0255332 A1 * | 8/2021 | Kowada | G01S 19/015 |

OTHER PUBLICATIONS

Tracy Cozzens, Raytheon M-code receiver deployment underway, GPS World, https://www.gpsworld.com/raytheon-m-code-receiver-deployment-underway/, Apr. 30, 2020, 6 pages.

Tracy Cozzens, Launchpad: M-code receiver, modules and software, GPS World, https://www.gpsworld.com/launchpad-m-code-receiver-modules-and-software/, Sep. 27, 2019, 11 pages.

Extended Search Report in European Application No. 21191029.4 dated Apr. 19, 2022, 9 pages.

* cited by examiner

GPS RECEIVER MODULE

GOVERNMENT SUPPORT

This invention was developed with U.S. government support under the program "MGUE Increment 2 Handheld Risk Reduction Prototyping—Objective A" by United States Department of Defense. The U.S. government has certain rights in this invention.

BACKGROUND

Global Positioning System (GPS) receivers are navigation devices that are capable of receiving information from one or more navigation satellites, which is then used to calculate the device's geographical position. The GPS receivers may also have additional software that give the receiver mapping and/or routing functionality.

Several satellite navigation systems currently exist, and several more are in development. Each satellite navigation system may use one or more signals that differ from other satellite navigation systems. GPS receiver technology is also under constant development, with new circuitry and antenna designs being produces on a regular basis. These changes in GPS signals and GPS receiver technology is problematic for customers that invest heavily in GPS receiver technology, who may have their GPS receivers rendered useless or become outdated with these changes. Therefore, it would be advantageous to provide a solution that cures the shortcomings described above.

SUMMARY

A navigation satellite receiver system is disclosed. In one or more embodiments, the navigation satellite receiver system includes a first host receiver. In one or more embodiments, the first host receiver includes a user interface. In one or more embodiments, the first host receiver includes a module connector. In one or more embodiments, the first host receiver includes a controller operably coupled with the user interface and the module connector. In one or more embodiments, the navigation satellite receiver system includes a first receiver module. The first receiver module is operably coupled to the first host receiver. In one or more embodiments, the first receiver module includes a module antenna configured to receive one or more satellite navigation signals. In one or more embodiments, the first receiver module includes an interface receiver card operatively coupled to the module antenna configured to process the one or more navigation signals. In one or more embodiments, the first receiver module includes a host connector communicatively coupled to the interface receiver card and configured to operably couple to the module connector. In one or more embodiments, the first receiver module includes a housing configured to receive and protect the interface receiver card, the module antenna, and the host connector In some embodiments of the navigation satellite receiver system, wherein the one or more navigation signals may include at least one of M-code, L1 C/A, L2C, L5, or L1C signals.

In some embodiments of the navigation satellite receiver system, the first receiver module may be decoupled from the first host receiver, wherein a second receiver module may be coupled to the first host receiver, wherein the second receiver module is configured to have different capabilities than the first receiver module.

In some embodiments of the navigation satellite receiver system, the first receiver module further comprises an external RF connector configured to communicatively couple to a host antenna.

In some embodiments of the navigation satellite receiver system, the first receiver module further comprises an antenna switching circuitry configured to switch the first receiver module between employing the module antenna and employing the host antenna.

In some embodiments of the navigation satellite receiver system the host connector will operably couple to the module connector when the host connector when the first receiver module is inserted into the first host receiver.

In some embodiments of the navigation satellite receiver system the module antenna has access to the satellite navigation signals when the first receiver module is coupled to the first host receiver.

A first receiver module is also disclosed. In one or more embodiments, the first receiver module includes a module antenna configured to receive one or more satellite navigation signals. In one or more embodiments, the first receiver module further includes an interface receiver card operatively coupled to the module antenna. In one or more embodiments, the first receiver module further includes a host connector communicatively coupled to the interface receiver card and configured to operably couple to a module connector of a first host receiver. In one or more embodiments, the first receiver module further includes a housing configured to receive and protect the interface receiver card, the module antenna, and the host connector.

In some embodiments of the first receiver module, the one or more navigation signals may include at least one of M-code, L1 C/A, L2C, L5, or L1C signals.

In some embodiments of the first receiver module, the first receiver module may be decoupled from the first host receiver, wherein the first receiver module may be coupled to a second host receiver, wherein the second host receiver is configured to have different capabilities than the first host receiver.

In some embodiments of the first receiver module, the first receiver module further includes an external RF connector configured to communicatively couple to a host antenna operably coupled to the first host receiver.

In some embodiments of the first receiver module, the first receiver module further includes an antenna switching circuitry configured to switch the first receiver module between employing the module antenna and the host antenna.

In some embodiments of the first receiver module, the host connector will operably couple to the module connector when the host connector when the first receiver module is inserted into the first host receiver.

In some embodiments of the first receiver module, the module antenna has access to the satellite navigation signals when the first receiver module is installed into the first host receiver.

In some embodiments of the first receiver module, employs the host antenna if the module antenna cannot receive the navigation signal.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
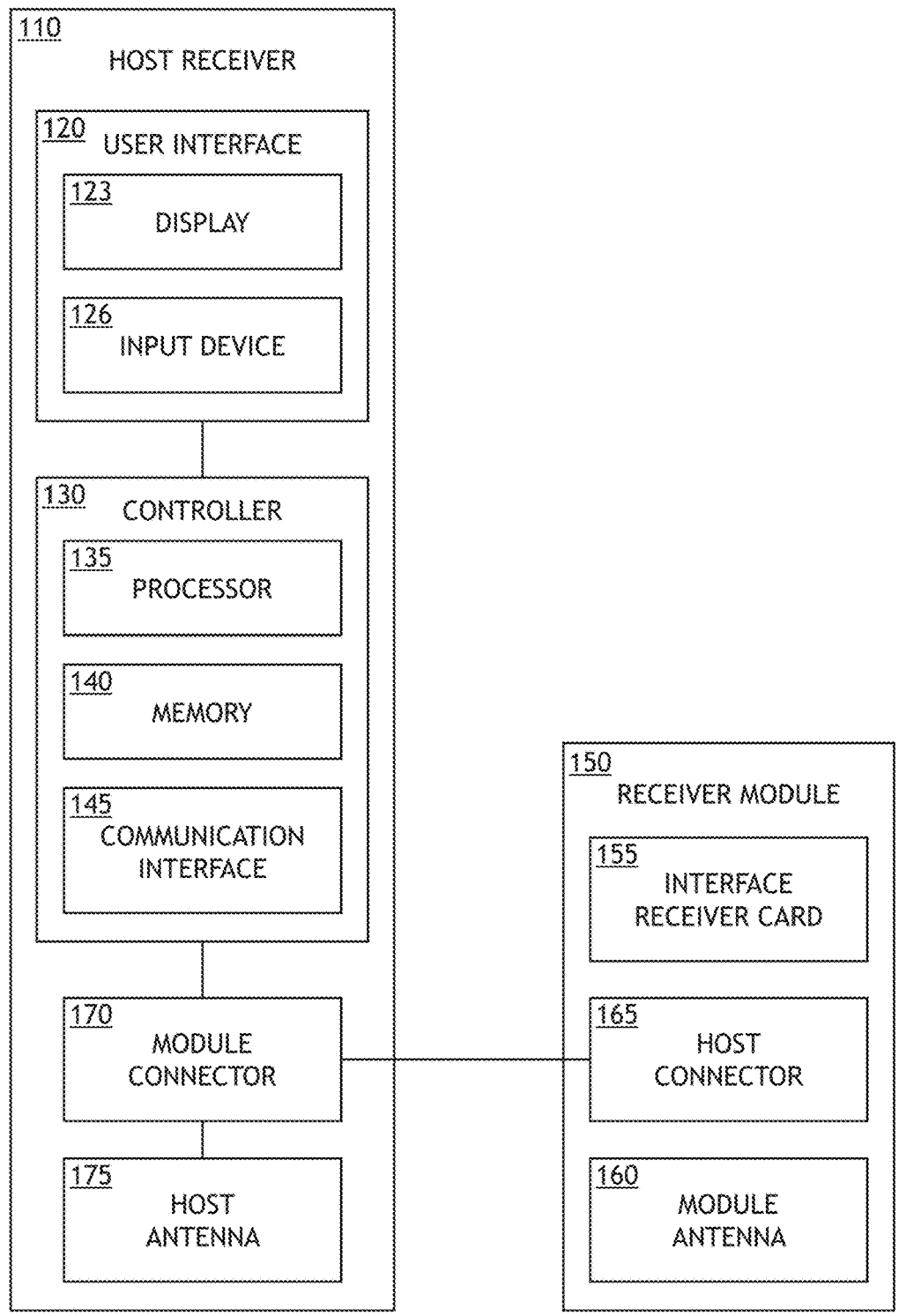
FIG. 1 illustrates a box diagram of a navigation satellite receiver system, in accordance with one or more embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

Accordingly, embodiments of the present disclosure are directed to a system and apparatus for receiving GPS signals, wherein a module containing both a GPS signal receiving card and an antenna for use by the GPS signal receiving card (e.g., an antenna specifically designed for use with the GPS signal receiving card) may be quickly installed into a legacy host receiver or other host receiver. By upgrading the host receiver through the swapping of a module, the host receiver and related componentry would not need to be discarded at every GPS receiver upgrade.

FIG. 1 illustrates a box diagram of a navigation satellite receiver system 100, in accordance with one or more embodiments of this disclosure. In embodiments, the navigation satellite receiver system 100 receives RF signals from one or more navigational satellites and determines the geographical position of navigation satellite receiver system 100 based on information processed from the navigational signal. The navigation satellite receiver system 100 may receive GPS signals from any satellite navigational system including but not limited to the Global Satellite System (GPS), the BeiDou navigational satellite system (BDS), Galileo, GLONASS, IRNSS/NavIC, and QZSS. The navigation satellite receiver system 100 may also receive any type of satellite navigational signal including but not limited to M-code, L1 C/A, L2C, L5, or L1C. For example, the navigation satellite receiver system 100 may be configured to receive M-code signals from GPS satellites.

The navigation satellite receiver system 100 may be any form of navigational satellite receiver known. For example, the navigation satellite receiver system 100 may be a handheld device. In another example, the navigation satellite receiver system 100 may be a device affixed to a vehicle. In another example, the navigation satellite receiver system 100 may be a device affixed to a weapon or weapon system.

In embodiments, the navigation satellite receiver system 100 includes a host receiver 110 (e.g., a first host receiver). The host receiver 110 encapsulates the componentry of the navigation satellite receiver system 100. For example, the host receiver 110 may appear as the 'shell' of a hand-held navigation satellite receiver system 100.

In embodiments, the host receiver 110 includes a user interface 120. The user interface 120 allows the navigation satellite receiver system 100 to communicate with a user. In embodiments, the user interface 120 includes a display 123. In some embodiments, the display 123 is incorporated into the shell of the host receiver 110. For example, the display 123 may be a screen on a hand-held navigation satellite receiver system 100. Alternatively, the display 123 may communicatively couple to the host-receiver 110, yet physically isolated from the host receiver 110. For example, the display 123 may be a separate screen on a computer terminal.

The display 123 may include any type of display device known in the art. For example, the display 123 may include, but are not limited to, a liquid crystal display (LCD), a light-emitting diode (LED) based display, an organic light-emitting diode (OLED) based display, an electroluminescent display (ELD), an electronic paper (E-ink) display, a plasma display panel (PDP), a display light processing (DLP) display, a cathode-ray tube (CRT), or the like. Those skilled in the art should recognize that a variety of display devices may be suitable for implementation in the present invention and the particular choice of display device may depend on a variety of factors, including, but not limited to, form factor, cost, and the like.

In embodiments, the user interface 120 includes an input device 126. The input device 126 may be any device known in the art including but not limited to buttons, switched, toggles, a keyboard, or a touchscreen display. In the case of a touchscreen display, those skilled in the art should recognize that a large number of touchscreen displays may be suitable for implementation in the present invention. For instance, the one or more displays 123 may be integrated with a touchscreen interface, such as, but not limited to, a capacitive touchscreen, a resistive touchscreen, a surface acoustic based touchscreen, an infrared based touchscreen, or the like. In a general sense, any touchscreen display capable of integration with the display portion of a display device is suitable for implementation in the present invention.

In embodiments, the navigation satellite receiver system 100 includes one or more controllers 130. The one or more controllers 130 may include one or more processors 135, memory 140, and a communication interface 145. The memory 140 may store one or more sets of program instructions. The one or more processors 135 may be configured to execute the one or more sets of program instructions to carry out one or more of the various steps described throughout the present disclosure. In some embodiments, the one or more controllers 130 includes or is coupled to the user interface 120 and other componentry of the host receiver 110.

The one or more processors 135 may include any one or more processing elements known in the art. In this sense, the one or more processors 135 may include any microprocessor device configured to execute algorithms and/or program instructions. In general, the term "processor" may be broadly defined to encompass any device having one or more processing elements, which execute a set of program instructions from a non-transitory memory medium (e.g., the memory 140), where the one or more sets of program instructions is configured to cause the one or more processors 135 to carry out any of one or more process steps.

The memory 140 may include any storage medium known in the art suitable for storing the one or more sets of program instructions executable by the associated one or more processors 135. For example, the memory 140 may include a non-transitory memory medium. For instance, the memory 140 may include, but is not limited to, a read-only memory (ROM), a random-access memory (RAM), a magnetic or optical memory device (e.g., disk), a magnetic tape, a solid-state drive, and the like. The memory 140 may be configured to provide display information to the display 123. In addition, the memory 140 may be configured to store user input information from the input device 126. The memory 140 may be housed in a common controller housing with the one or more processors 135. The memory 140 may, alternatively or in addition, be located remotely with respect to the spatial location of the processors 135, or the one or more controllers 130. For example, the one or more processors 135 and/or one or more controllers 130 may access a remote memory 140 accessible through a network (e.g., wireless, and the like) via one or more communication interfaces 145.

The one or more communication interfaces 145 may be operatively configured to communicate with components of the one or more controllers 130. For example, the one or more communication interfaces 145 may be configured to retrieve data from the one or more processors 135 or other devices, transmit data for storage in the memory 140, retrieve data from storage in the memory 140, and so forth. The one or more communication interfaces 145 may also be communicatively coupled with the one or more processors 135 to facilitate data transfer between components of the one or more controllers 130 and the one or more processors 135. It should be noted that while the one or more communication interfaces 145 is described as a component of the one or more controllers 130, one or more components of the one or more communication interfaces 145 may be implemented as external components communicatively coupled to the one or more controllers 130 via a wired and/or wireless connection. The one or more controllers 130 may also include and/or connect to one or more user interfaces 120 (e.g., display 123).

In embodiments, the navigation satellite receiver system 100 includes a receiver module 150 (e.g., a first receiver module). The receiver module 150 contains an interface receiver card 155 coupled to a module antenna 160 that are designed for the reception and processing of navigation signals (i.e., the receiver module provides the signal reception function and signals processing function of the navigation satellite receiver system 100). For example, the receiver module 150 may include one or more processors and circuitry configured to process navigation signals as well as one or more ports to receive and send data to other components of the receiver module (e.g., the module antenna) or the host receiver 110. The receiver module 150 may be configured to receive and process any satellite navigation signal known the art and as mentioned herein. For example, the receiver module 150 may receive (e.g., via the module antenna 160) and process, via the interface receiver card 155) M-code signals received from a GPS satellite.

The interface receiver card 155 may be of any form or type known in the art. For example, the interface receiver card 155 may be a serial interface card. For instance, the interface receiver card may be a miniaturized serial interface (MSI) card. For instance, the interface receiver card 155 may be an MSI card configured to process M-code signals from a GPS satellite. In another example, the interface receiver card 155 is a serial interface receiver card. In another example, the interface receiver card 155 is a parallel interface receiver card.

The module antenna 160 may be of any form or type known in the art. For example, the module antenna 160 may be a small patch antenna. For instance, the module antenna 160 may be a small patch data configured to receive M-Code signals.

In embodiments, the receiver module 160 includes a host connector 165. The host connector 165 is communicatively coupled to the interface receiver card 155 and is configured to communicatively couple to a module connector 170 disposed on the host receiver 110. The module connector 170 is communicatively coupled to the controller 130. The coupling of the host connector 165 and the module connector 170 provide a communicative link between the host receiver 110 and the receiver module 150.

The module connector 170 and host connector 165 may be any type of connecting componentry pair known in the art including but not limited to pluggable connectors, modular connectors, flat flex connectors, card edge connectors, coaxial connectors, USB connectors, terminal junction systems, and the like. For example, the module connector 170 and host connector 165 pair may comprise a 60-pin interface module. For instance, the host connector 165 may include the female section of the 60-pin interface module and the module connector 170 may include a male section of the 60-pin interface module communicatively coupled to the host receiver 110 directly or via a cable or ribbon. In another instance, the module connector 170 may include the female section of the 60-pin interface module and the host connector 165 may include the male section of the 60-pin interface module communicatively coupled to the receiver module 150 directly or via a cable or ribbon. Any connector pair and any configuration of a connector may be used to communicatively couple the host receiver 110 to the receiver module 150. Therefore, the above description should not be interpreted as a limitation of the present disclosure, but merely as an illustration.

In embodiments, the host receiver 110 includes a host antenna 175. The host antenna 175 is configured to receive satellite navigation signals. The host antenna 175 may be communicatively linked to the receiver nodule (e.g., via the module connector 170 or a separate antenna interface). The host antenna 175 may be employed alongside the module antenna 160 to increase the reception of satellite navigation signals. Alternatively, the host antenna 175 may provide all of the received satellite navigation signals for the navigation satellite receiver system 100 (e.g., the receiver module 150 employs the host antenna 175 if the module antenna 160 cannot receive the navigation signal). In other words, if the module antenna is disabled, the host antenna 175 may then be selected to act as the antenna for the receiver module 150. The host antenna 175 may not be as efficient or as tailored for receiving the satellite navigation signals for the receiving module 150 as the module antenna 160, but may allow the navigation satellite receiver system 100 to remain functioning upon fault by the module antenna 160.

Figure 2:
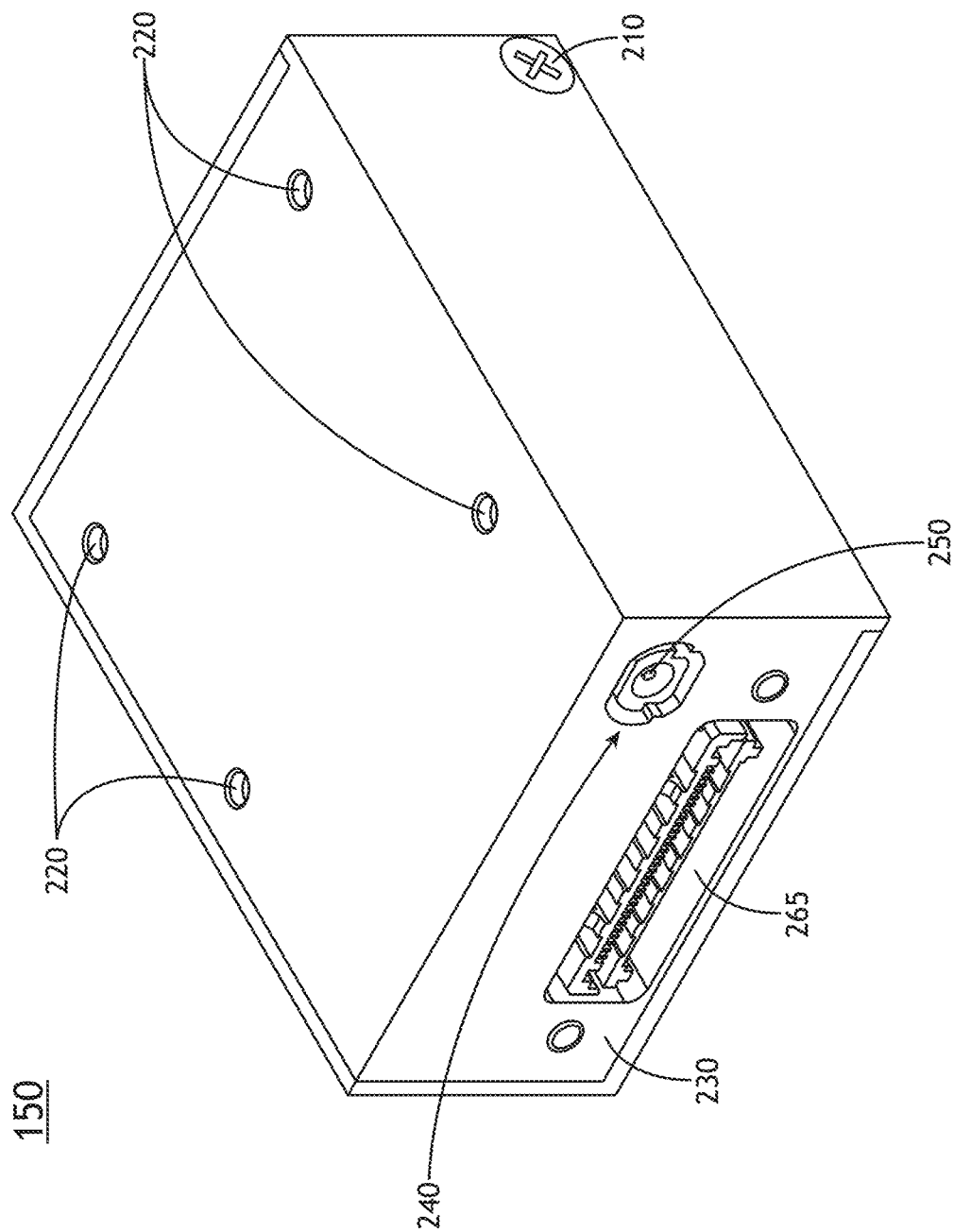
FIG. 2 illustrates a perspective view of the receiver module, in accordance with one or more embodiments of this disclosure.

FIG. 2 is an illustration of a perspective view of the receiver module 150, in accordance with one or more embodiments of this disclosure. In embodiments, the receiver module 150 includes a housing 200 that encapsulates and protects the components of the receiver module 150 (e.g., the interface receiver card 155 and the module antenna 160). The housing 200 may be constructed of any shape or made of any material known in the art including but not limited to plastic, metal, or composite resin. The housing 200 may assembled by any means known in the art. For example, the housing may be assembled via one or more screws 210 (e.g., screw holes 220 may be drilled into the housing 200 to secure components within the housing 200).

In embodiments, the housing includes a first orifice 230, where the host connector 165 is mounted. The housing includes a second orifice 240 where host antenna connector 250 is mounted. The host antenna connector 250 couples to the host antenna.

Figure 3:
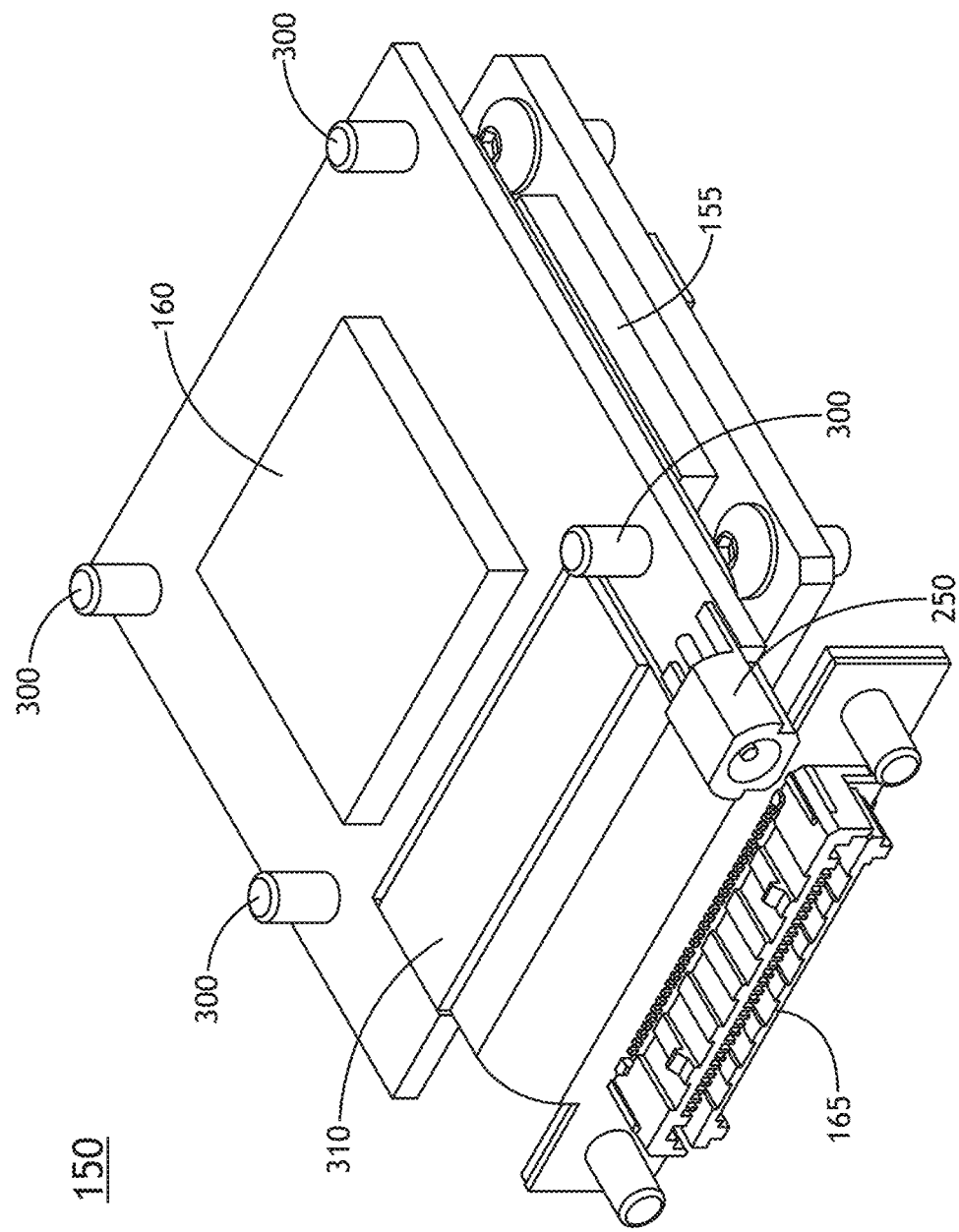
FIG. 3 illustrates a perspective view of the receiver module with the housing removed, in accordance with one or more embodiments of this disclosure.

FIG. 3 is an illustration of a perspective view of the receiver module 150 with the housing 200 removed, in accordance with one or more embodiments of this disclosure. Removal of the housing 200 reveals several screw posts 300 that allow screws 210 to be inserted through screw holes 220 in the housing 200 to be attached to the hollow within the screw posts 300. The module antenna 160 is presented as a layer superior to the interface receiver card 155. A card connector 310 is used to communicatively couple the interface receiver card 155 to the host connector 165. The card connector 310 may be any type of wired connection device known, including but not limited to a cable or ribbon.

Figure 4:
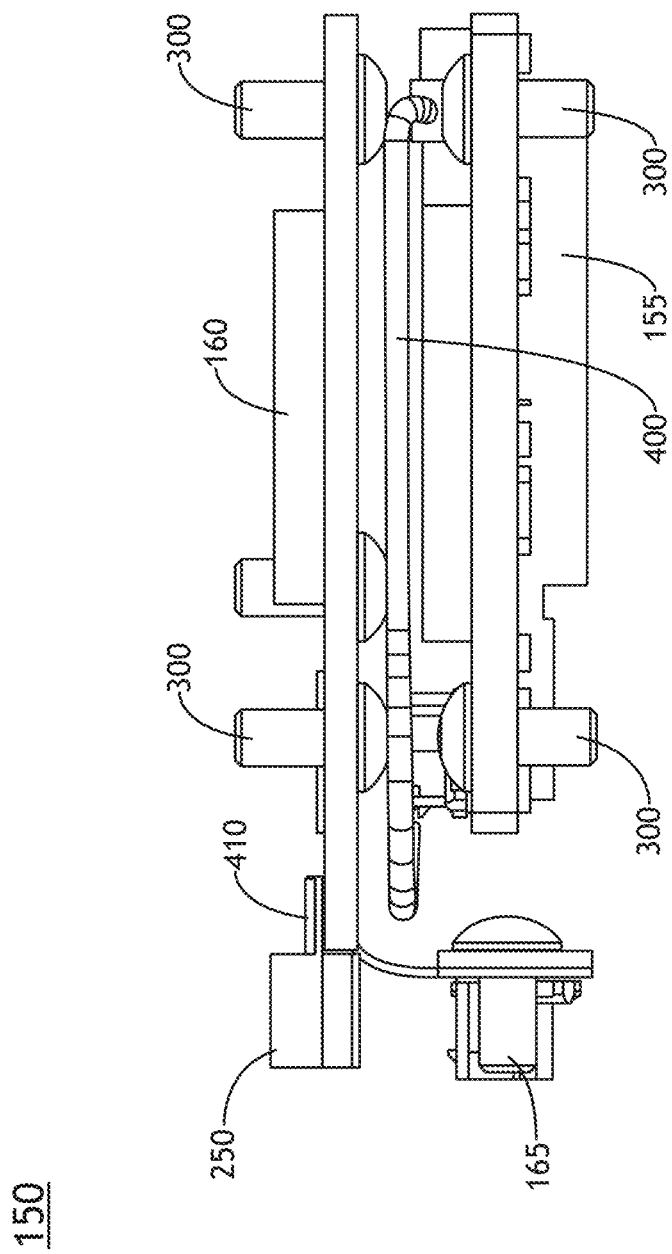
FIG. 4 illustrates a side view of the receiver module with the housing 200 removed, in accordance with one or more embodiments of this disclosure.

FIG. 4 is an illustration of a side view of the receiver module 150 with the housing 200 removed, in accordance with one or more embodiments of this disclosure. The module antenna 160 is communicatively coupled to the interface receiver card 155 via a card connection cable 400. The receiver module 150 also contains antenna circuitry (not shown) for amplification and filtering of the RF signal as well as for switching with the host antenna. For example, the antenna circuitry may include antenna switching circuitry configured to antenna switching circuitry configured to switch the first receiver module between employing the module antenna and employing the host antenna. A RF connection line 410 (partially removed for clarity communicatively couples the host antenna connector 250.

It should be understood that many of the wireline connections in this disclosure may be replaced with wireless connections. For example, data may be transferred from the interface receiver card 155 to the host receiver via a wireless connection. The wireless connection may utilize any wireless modality known in the art including but not limited to GSM, GPRS, CDMA, EV-DO, EDGE, WiMAX, 3G, 4G, 4G LTE, 5G, WiFi protocols, radio frequency (RF), LoRa, Zigbee, Bluetooth, NFC, and the like. Therefore, the above description should not be interpreted as a limitation of the present disclosure, but merely as an illustration.

In embodiments, the receiver module 150 is easily inserted and/or removed from the host receiver 110. The mechanism for inserting and removing the receiver module 150 from the host receiver 110 may be any mechanism known in the art. For example, the receiver module 150 may be inserted into the host receiver 110 and secured into place via screws and screw holes. In another example, the receiver module 150 may be inserted into the host receiver 110 and secured via a friction lock. In another example, the receiver module 150 may be inserted into the host receiver 110 and secured via friction lock. Multiple combinations of locking mechanisms may be used to secure the receiver module 150 within the host receiver 110. In embodiments, the host connector 165 couples with the module connector 170 when the receiver module 150 is inserted into the host receiver 110. It should be understood that the module antenna 165 is able to receive satellite signals when the receiver module 150 is secured within the host receiver 110 (i.e., the insertion of the receiver module 150 into the host receiver 110 does not block satellite navigation signals to the module antenna 160.

In embodiments, the receiver module 150 may be removed (e.g., decoupled) from the host receiver 110 and replaced (e.g., coupled) with a different receiver module (e.g., a second receiver module). For example, a receiver module 150 that receives and processes M-code signals may be swapped for a newer receiver module 150 with greater M-code receiving and/or processing capabilities. In another example, a receiver module that receives and processes M-code signals may be swapped for a receiver module 150 that receives and processes L5 signals. In this manner, a host receiver 110 may be retrofitted with a different receiver module 150 without having to greatly alter or discard the host receiver 110.

Conversely, the receiver module 150 may be removed from the host receiver 110 and installed into a different host receiver 110 (e.g., a second host receiver). For example, a receiver module that receives and processes M-code signals may be moved from the host receiver 110 of a hand-held navigation satellite receiver system 100 to the host receiver 110 of a vehicle navigation satellite receiver system 100. In this manner, the function of a satellite receiver system 100 may be changed without having to remove and/or replace the host receiver 110.

In embodiments, the receiver module may be accessed without being secured into the host receiver. For example, the receiver module 150 may be communicatively coupled via the host connector 165 to a computer. For example, a cable may link the host connector to an external connector on a laptop computer, allowing a user to access information within the receiver module.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed:

1. A navigation satellite receiver system comprising:
    a first host receiver comprising:
        a user interface;
        a module connector;
        a controller operatively coupled with the user interface and the module connector; and
        a host antenna configured to receive one or more satellite navigation signals; and
    a first receiver module operably coupled to the first host receiver comprising:
        a module antenna configured to receive one or more satellite navigation signals;
        an interface receiver card operatively coupled to the module antenna configured to process the one or more navigation signals;
        a host connector communicatively coupled to the interface receiver card and configured to operably couple to the module connector;
        a housing configured to receive and protect the interface receiver card, the module antenna, and the host connector; and
        an antenna switching circuitry configured to switch the first receiver module between employing the module antenna and the host antenna of the first host receiver.

2. The system of claim 1, wherein the one or more navigation signals may include at least one of M-code, L1 C/A, L2C, L5, or L1 C signals.

3. The system of claim 1, wherein the first receiver module may be decoupled from the first host receiver, wherein a second receiver module may be coupled to the first host receiver, wherein the second receiver module is configured to have different capabilities than the first receiver module.

4. The system of claim 1, wherein the first receiver module further comprises an external RF connector configured to communicatively couple to a host antenna.

5. The system of claim 1, wherein the host connector will operably couple to the module connector when the first receiver module is inserted into the first host receiver.

6. The system of claim 1, wherein the module antenna has access to the satellite navigation signals when the first receiver module is coupled to the first host receiver.

7. A first receiver module comprising:
    a module antenna configured to receive one or more satellite navigation signals;
    an interface receiver card operatively coupled to the module antenna;
    a host connector communicatively coupled to the interface receiver card and configured to operably couple to a module connector of a first host receiver; and
    a housing configured to receive and protect the interface receiver, the module antenna, and the host connector,
    wherein the first receiver module further comprises an antenna switching circuitry configured to switch the first receiver module between employing the module antenna and a host antenna of the first host receiver.

8. The first receiver module of claim 7, wherein the one or more navigation signals may include at least one of M-code, L1 C/A, L2C, L5, or L1C signals.

9. The first receiver module of claim 7, wherein the first receiver module may be decoupled from the first host receiver, wherein the first receiver module may be coupled to a second host receiver, wherein the second host receiver is configured to have different capabilities than the first host receiver.

10. The first receiver module of claim 7, wherein the first receiver module further comprises an external RF connector configured to communicatively couple to a host antenna operably coupled to the first host receiver.

11. The first receiver module of claim 7, wherein the host connector will operably couple to the module connector when the first receiver module is inserted into the first host receiver.

12. The first receiver module of claim 7, wherein the module antenna has access to the satellite navigation signals when the first receiver module is installed into the first host receiver.

13. The first receiver module of claim 7, wherein the first receiver module employs a host antenna if the module antenna cannot receive the navigation signal.

* * * * *